United States Patent
Cho

(10) Patent No.: US 8,576,181 B2
(45) Date of Patent: Nov. 5, 2013

(54) MOBILE TERMINAL USING PROXIMITY TOUCH AND WALLPAPER CONTROLLING METHOD THEREOF

(75) Inventor: Seon-Hwi Cho, Incheon (KR)

(73) Assignee: LG Electronics Inc., Seoul (KR)

( * ) Notice: Subject to any disclaimer, the term of this patent is extended or adjusted under 35 U.S.C. 154(b) by 1205 days.

(21) Appl. No.: 12/468,796

(22) Filed: May 19, 2009

(65) Prior Publication Data

US 2009/0289914 A1    Nov. 26, 2009

(30) Foreign Application Priority Data

May 20, 2008 (KR) .......................... 10-2008-0046743
May 21, 2008 (KR) .......................... 10-2008-0047125

(51) Int. Cl.
*G06F 3/041* (2006.01)
(52) U.S. Cl.
USPC ........................................................ 345/173
(58) Field of Classification Search
USPC ........................................................ 345/173
See application file for complete search history.

(56) References Cited

U.S. PATENT DOCUMENTS

| | | | |
|---|---|---|---|
| 5,579,037 A * | 11/1996 | Tahara et al. ................. | 345/173 |
| 7,786,980 B2 * | 8/2010 | Lashina ........................ | 345/173 |
| 2009/0327977 A1 * | 12/2009 | Bachfischer et al. ......... | 715/863 |

* cited by examiner

*Primary Examiner* — Amare Mengistu
*Assistant Examiner* — Shawna Stepp Jones
(74) *Attorney, Agent, or Firm* — Lee, Hong, Degerman, Kang & Waimey

(57) ABSTRACT

Discloses are a mobile terminal having a proximity touch and a method for controlling a display screen thereof. A difference of recognition rates caused by a minute difference of capacitances generated when a human body approaches a touch screen depending on users can be calibrated to be suitable for each user. Also, in the state of the recognition rate being calibrated, operations of objects, i.e., icons, avatars and menus, displayed on a wallpaper and displaying effects on the wallpaper can variously be controlled according to a user's proximity touch, thereby allowing users to control the display screen more conveniently and accurately.

9 Claims, 16 Drawing Sheets

FIG. 20
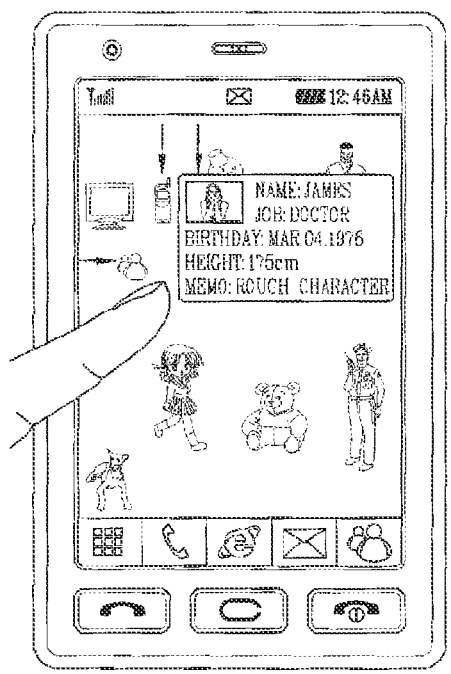
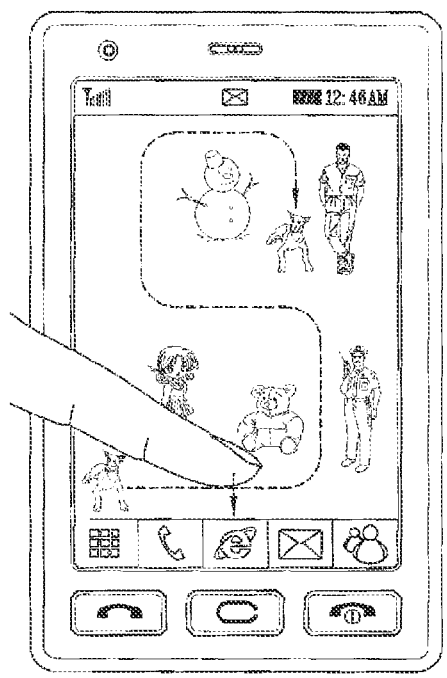

MOBILE TERMINAL USING PROXIMITY TOUCH AND WALLPAPER CONTROLLING METHOD THEREOF

CROSS-REFERENCE TO A RELATED APPLICATION

Pursuant to 35 U.S.C. §119(a), this application claims the benefit of earlier filing date and right of priority to Korean Application Nos. 10-2008-0046743 and 10-2008-0047125, filed on May 20, 2008 and May 21, 2008, respectively, the contents of which are incorporated by reference herein in their entireties.

BACKGROUND OF THE INVENTION

1. Field of the Invention

The present invention relates to a mobile terminal capable of controlling a display screen by use of a touching function, and a display screen (wallpaper) controlling method thereof.

2. Background of the Invention

Mobile terminals may be configured to perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement.

Among others, a touch function of the mobile terminal allows even users, who are not familiar to input buttons or keys, to conveniently operate the mobile terminal using a touch screen. Recently, in addition to a simple touch input, such touch function is being established as an important function of the mobile terminal together with a user interface (UI).

SUMMARY OF THE INVENTION

Therefore, an object of the present invention is to provide a mobile terminal capable of variously displaying operations of objects and displaying effects on a screen according to proximity position and proximity speed, and a display screen (wallpaper) controlling method thereof.

Another object of the present invention is to provide a mobile terminal capable of calibrating a touch recognition rate upon controlling operations of objects and displaying effects on a screen, and a display screen (wallpaper) controlling method thereof.

To achieve these and other advantages and in accordance with the purpose of the present invention, as embodied and broadly described herein, there is provided a mobile terminal including a touch screen for displaying a plurality of objects on a screen, a sensing unit for detecting a real touch on a surface contact point of the touch screen and a proximity touch of a pointer, and a controller for calibrating recognition rates generated due to a difference of capacitances upon the pointer inputting a proximity touch at a maximum proximity position and at a minimum proximity position, according to a sensing signal provided from the sensing unit.

The controller may display reference figures indicating the maximum proximity position and the minimum proximity position and a guide figure increased or decreased in size in cooperation with the movement of the pointer, thus to set a maximum capacitance and a minimum capacitance when the size of the guide figure is the same to that of the reference figures. Afterwards, the controller may display a reference figure indicating a minimum proximity position when a real touch is detected and a guide figure increased in size in cooperation with the movement of the pointer, while displaying a reference figure indicating a maximum proximity position when a proximity touch is detected, and a guide figure decreased in size in cooperation with the movement of the pointer.

The objects may include icons, avatars and menus, and the screen may be a wallpaper configured in a form of animation or flash.

The operations relating to the objects may include sizes, movement speeds, movements, vibration and effect sounds of the objects.

The controller may control the objects to be differently displayed according to proximity position and proximity speed, and display an object hidden in a corresponding position when the pointer comes close to a predetermined region of the screen.

In one aspect of the present invention, there is provided a method for controlling a display screen of a mobile terminal may include calibrating a recognition rate of a proximity touch, displaying a plurality of objects on a screen when the recognition rate of the proximity touch is calibrated, detecting a real touch on a surface contact point or a proximity touch of a pointer by use of a touch screen, and controlling operations relating to the objects according to a sensing signal provided from the touch screen.

The calibrating of recognition rate of the proximity touch may include displaying a proximity touch calibration screen, detecting an initial touch input by a pointer on the calibrations screen, displaying different reference figures for calibrating a recognition rate according to a type of the detected touch, and a guide circle increased or decreased in size in cooperation with the movement of the pointer, and comparing the guide figure with the reference figure according to the change in the proximity position of the pointer so as to calibrate a maximum capacitance and a minimum capacitance.

The reference figure may include a circle and other polygons, and be one of stylus pen and a finger.

When the detected touch is a real touch, a reference figure indicating a minimum proximity position and a guide figure increased in size in cooperation with the movement of the pointer may be displayed.

When the detected touch is a proximity touch, a reference figure indicating a maximum proximity position and a guide figure decreased in size in cooperation with the movement of the pointer may be displayed.

When the guide figure is the same to the reference figure due to the proximity position being closer or farther, a maximum capacitance and a minimum capacitance may be set.

The objects may include icons, avatars and menus, and the screen may be a wallpaper configured in a form of animation or flash.

The operations relating to the objects may include sizes, movement speeds, movements, vibration and effect sounds of the objects.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 15 to 20 are views showing examples of performing displaying of screens using the proximity touch in FIG. 5.

DETAILED DESCRIPTION OF THE INVENTION

Description will now be given in detail of a mobile terminal according to the present invention, with reference to the accompanying drawings.

Figure 1:
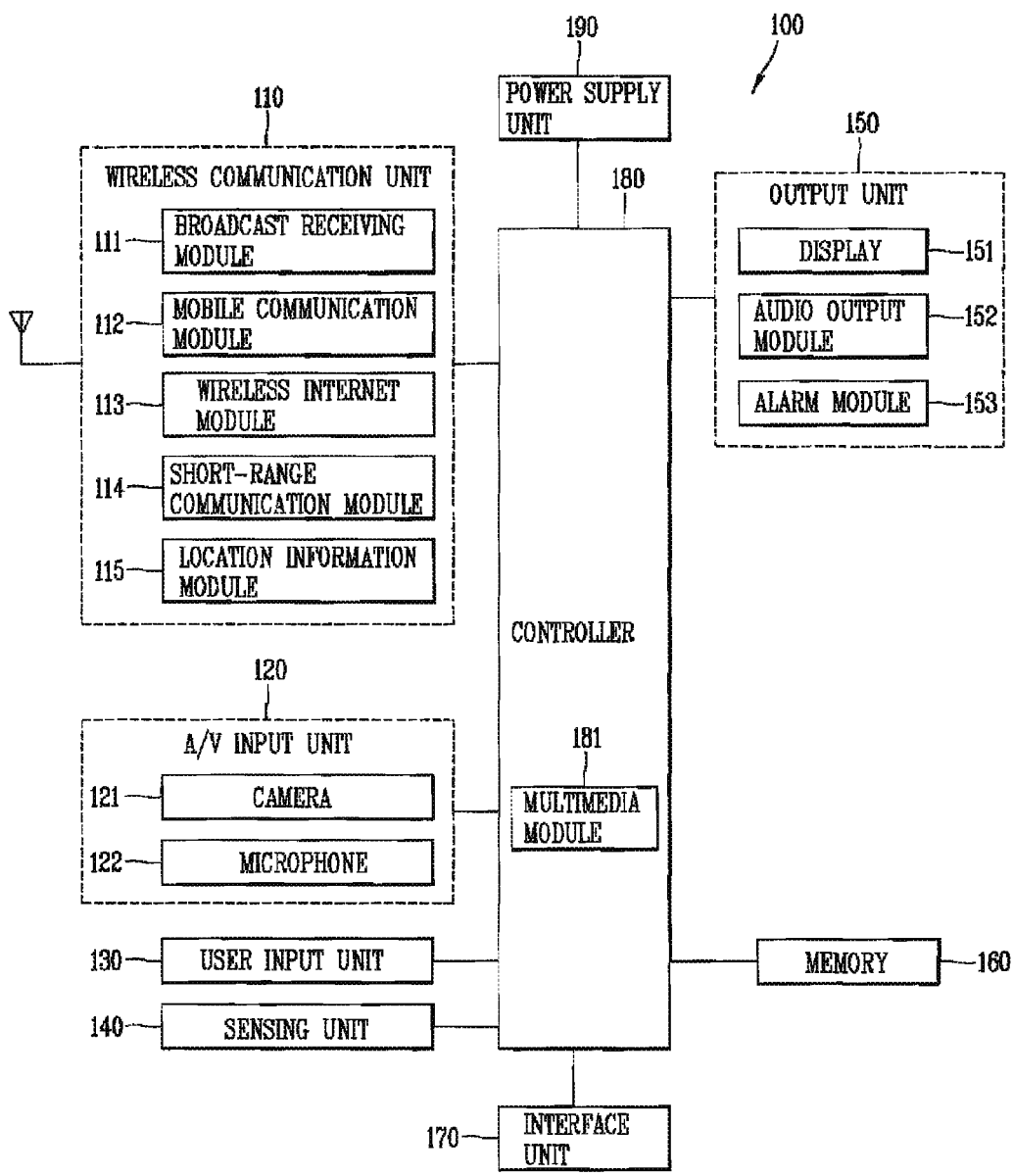
FIG. 1 is a block diagram of a mobile terminal in accordance with one embodiment of the present invention.

FIG. 1 is a block diagram of a mobile terminal in accordance with one embodiment of the present invention.

A mobile terminal may be implemented in various types of terminals. Examples of such terminals described in this specification may include mobile phones, smart phones, notebook computers, digital broadcast terminals, Personal Digital Assistants (PDA), Portable Multimedia Players (PMP), navigators and the like.

A mobile terminal 100 shown in FIG. 1 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal.

The short-range communication module 114 denotes a module for short-range communications. Suitable technologies for implementing this module may include BLUE- TOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Such interface unit 170 may receive data from an external device, or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The mobile terminal 100 may include two or more of such displays 151 according to its embodiment. For example, the mobile terminal 100 may simultaneously include an external display (not shown) and an internal display (not shown).

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be outputted via the display 151 or the audio output module 152.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As mentioned above, the internal components of the mobile terminal related to the present invention have been described from the perspective of their functions. Hereinafter, external components of the mobile terminal related to the present invention will be described from the perspective of their functions with reference to FIG. 2. The mobile terminal may be implemented in a variety of different configurations. Examples of such configurations include folder type, slide type, bar type, rotating type, swing type or the like. For the sake of brief explanation, further disclosure will primarily relate to a slide-type mobile terminal. However, the present invention may not be limited to the slide-type mobile terminal, but can be applied to other types of terminals including the aforesaid types of terminals.

Figure 2:
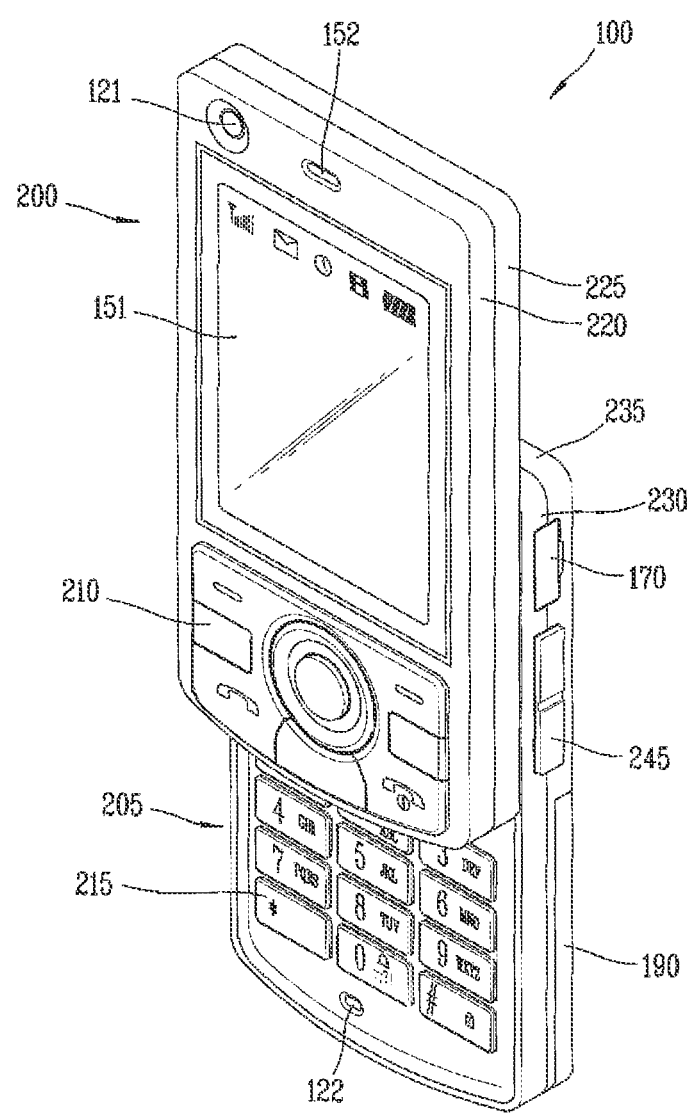
FIG. 2 is a front perspective view of the mobile terminal in accordance with the one embodiment of the present invention.

FIG. 2 is a perspective view of a front side of a mobile terminal in accordance with one embodiment of the present invention.

The mobile terminal 100 of the present invention may comprise a first body 200, and a second body 205 configured to slidably cooperate with the first body 200 in at least one direction. For a folder-type mobile terminal, the mobile terminal 100 may include a first body, and a second body 205 configured to have at least one side folded or unfolded with respect to the first body 200.

The first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position).

The mobile terminal may be operable in a standby (idle) mode when in the closed configuration, but this mode can be released by the user's manipulation. Also, the mobile terminal may typically be operable in an active (phone call) mode in the open configuration. Here, this mode may be changed into the idle mode according to the user's manipulation or after a certain time elapses.

A case (housing, casing, cover, etc.) forming the outside of the first body 200 is formed by a first front case 220 and a first rear case 225. Various electronic components may be disposed in a space between the first front case 220 and the first rear case 225. One or more intermediate cases may additionally be disposed between the first front case 220 and the first rear case 225.

The cases can be formed of resin in a manner of injection molding, or formed using metallic materials such as stainless steel (STS) and titanium (Ti).

A display 151, an audio output module 152, a camera 121 or a first user input unit 210 may be disposed at the first front case 220 of the first body 200.

The display 151 may include LCD, OLED, and the like, which can visibly display information.

The display 151 and a touchpad can be layered with each other such that the display 151 can be configured to function as a touch screen so as to allow a user to input information in a touching manner.

The audio output module 152 may be implemented as a speaker.

The camera 121 may be implemented to be suitable for a user to capture still images or video.

Like the first body 200, a case configuring the outside of the second body 205 may be formed by a second front case 230 and a second rear case 235.

The second user input unit 215 may be disposed at the second body 205, in detail, at a front face of the second front case 230. A third user input unit 245, a microphone 122 and an interface unit 170 may be disposed either at the second front case 230 or at the second rear case 235.

The first to third user input units 210, 215 and 245 may be named as a user input unit 130. Any tactile manner that a user can touch, e.g., the display 151, for manipulation can be employed for the user input unit 130.

For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 is used for inputting commands such as START, END, SCROLL or the like, and the second user input unit 215 is used for inputting numbers, characters, symbols, or the like.

Also, the third user input unit 245 can be operated as a hot key for activating a specific function within the mobile terminal.

The microphone 122 may be implemented to be suitable for receiving user's voice or various sounds.

The interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a Bluetooth port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like.

The power supply 190 may be disposed at a side of the second rear case 235 to provide power to the mobile terminal.

The power supply 190 may be a rechargeable battery, for example, to be attachable/detachable for charging.

As shown in FIGS. 1 and 2, the mobile terminal 100 may be configured to operate within a communication system which transmits data via frames or packets, including both wireless and wireline communication systems, and satellite-based communication systems.

Hereinafter, a communication system within which the mobile terminal related to the present invention can operate will be described with reference to FIG. 3.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 3:
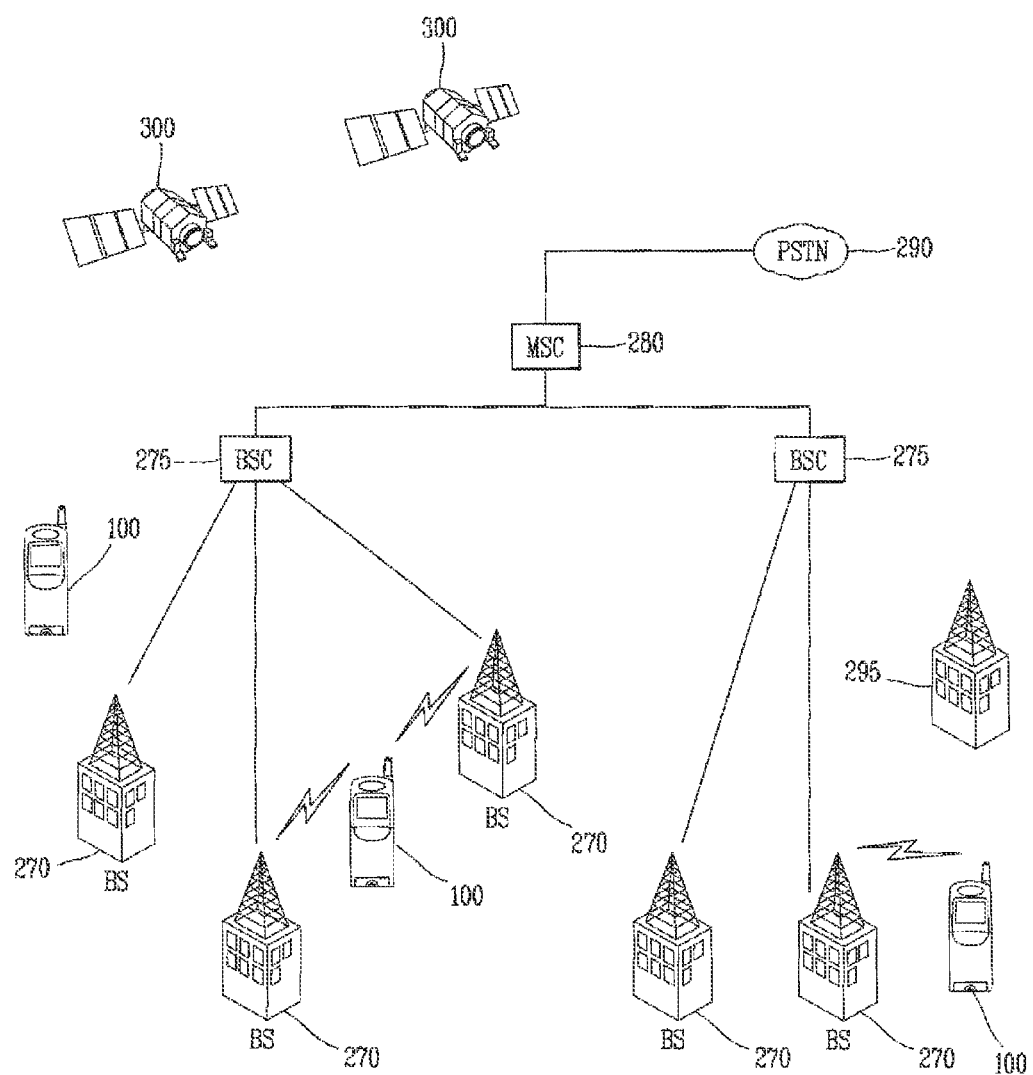
FIG. 3 is a block diagram of a wireless communication system operable with the mobile terminal in accordance with the one embodiment of the present invention.

Referring now to FIG. 3, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 3.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 3, transmits a broadcast signal to the mobile terminals 100 operating within the system. The broadcast receiving module 111 (FIG. 1) is typically configured inside the mobile terminal 100 to receive broadcast signals transmitted by the BT 295.

Figure 4:
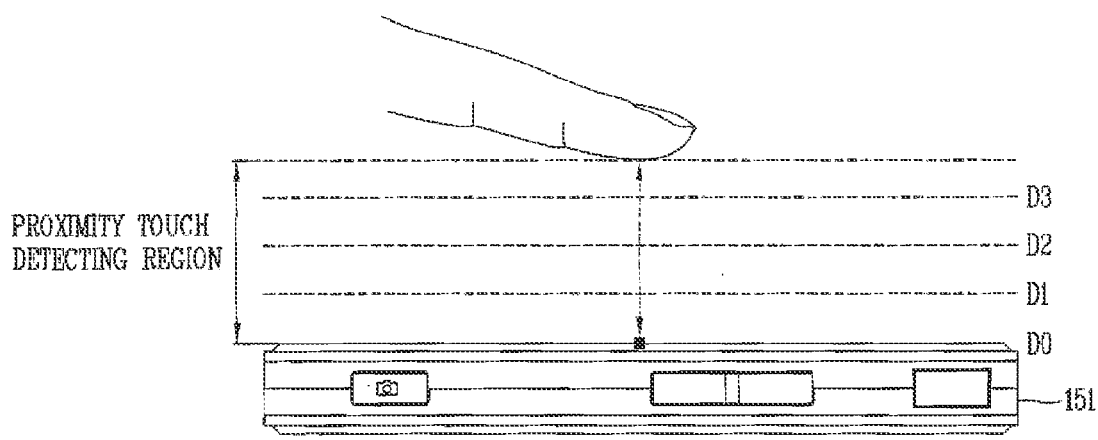
FIG. 4 is an exemplary view showing that a proximity touch detecting region detected by a proximity sensor is divided into a plurality of proximity positions according to the present invention.

FIG. 3 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, a method for inputting information using a proximity touch and/or a real-touch in the mobile terminal having such configuration will be described.

A proximity touch in the present invention may denote that a pointer is positioned close to a screen without actually touching the screen. Preferably, the pointer may include subjects, such as stylus pen, finger or the like, for substantially touching a specific portion on a display screen or proximately touching the portion.

As shown in FIG. 1, the controller 180 according to the present invention may control the mobile terminal by recognizing a proximity touch as a specific signal input. That is, the mobile terminal 100 according to the one embodiment of the present invention may be configured such that when a pointer approaches a screen within a range of a predetermined distance, it is recognized as a proximity touch, so as to perform, for example, viewing of various lists and automatic input function (e.g., ID and password). The predetermined distance may denote a perpendicular distance between the pointer and the screen.

In the present invention, a real-touch may denote that a pointer substantially touches a screen. The real-touch may be performed by disposing a touch screen on a display. Here, the controller 180 may perform a control operation of the mobile terminal by recognizing the real-touch as a specific signal input.

As shown in FIG. 1, the mobile terminal 100 according to the one embodiment of the present invention may detect the proximity touch and the real-touch by the sensing unit 140. The sensing unit 140 may be provided with various sensors for performing different sensing functionalities, and also provided with a proximity sensor, a haptic sensor and the like for detecting the proximity touch and the real-touch.

The proximity sensor may detect without any mechanical contact by use of an electromagnetic force or infrared rays whether an object (or subject) approaches a detection surface of a switch or exists near the detection surface. Preferably, the proximity sensor may be configured as a proximity switch, which outputs an ON/OFF signal when a subject to be detected comes within a detection distance defined by each sensor without any mechanical contact, other than outputting the ON/OFF signal responsive to a mechanical contact.

Hence, the proximity sensor configured as the proximity switch may have a lifespan longer than that of a haptic switch and obtain considerably high utilization. The proximity sensor configured as the proximity switch may operate such that while an oscillator circuit oscillates a high frequency sine wave, if a subject to be detected moves close to a detection surface of a sensor, an oscillation amplitude of the oscillator circuit is attenuated or stopped, and such change is converted into an electric signal, thereby detecting an existence of the subject to be detected.

The haptic sensor may denote a sensor for detecting a contact of a specific subject as strong as a person can feel or stronger than that. The haptic sensor can detect various information, including how rough a contact surface is, how hard a contact subject is, what the temperature of a contacted portion is, and the like.

Meanwhile, the sensing unit 140 may detect proximity patterns, such as proximity distance and proximity speed, as a detailed operation related to a proximity touch. The proximity distance may denote a distance of a pointer being far away from a screen. In particularly, a minimum proximity distance may denote a shortest distance of the pointer being far away from the screen. Also, the proximity speed may include a speed of a pointer moving towards a screen or a speed of the pointer moving away from the screen.

The sensing unit 140 may also detect a touch-drag or a proximity-drag, in relation to a real touch and/or a proximity touch. The sensing unit 140 may detect various information related to a dragged direction of the touch-drag and/or proximity-drag, a dragged speed, a dragged distance, and the like. The touch-drag indicates that a touched point is dragged in a state that a real touch is maintained, and the proximity-drag indicates that a proximately touched point is dragged in a state that a proximity touch is maintained.

Further, inputting a proximity touch above a predetermined point of a screen in the embodiments of the present invention may denote that a pointer is located at a position of a space perpendicularly corresponding to the predetermined point and thus the position is recognized as a proximity touch.

Hereinafter, an example that the mobile terminal 100 having a touch screen will be described.

The mobile terminal 100 in accordance with the one embodiment of the present invention can control an information input function by using a proximity touch, and also control a display screen based upon the relation between a real touch and a proximity touch. For instance, the mobile terminal 100 can perform various functions of scrolling a screen, zooming a screen, rotating a screen, displaying information and the like, based upon the relation between the real touch and the proximity touch.

The proximity touch sensor (proximity sensor) may detect a proximity touch according to the change in a capacitance generated when a part of body, e.g., a finger, comes in contact with a surface of a touch screen. FIG. 4 is an exemplary view showing that a proximity touch detecting region detected by the proximity sensor is divided into a plurality of proximity positions (or proximity distances). The number of proximity positions shown in FIG. 4 may depend on the performance of the proximity sensor and a target to be controlled, and the present invention exemplarily illustrates four proximity positions D0 to D3. Here, the proximity touch may denote that a pointer is positioned at an outer region of each proximity position D0 to D3.

In general, a mobile terminal may be configured such that the number, positions and types of objects displayed on a display 151 are fixed according to manufacturers and types of devices. Thus, the present invention controls, in various manners, operations of objects, namely, icons, avatars, menus and the like displayed on the display 151, and their displaying effects on a screen.

In order to perform the embodiment, at least one or more icons touched by a pointer for selection may be displayed on the display 151 of the mobile terminal. The icons may include an icon for controlling operations of the mobile terminal itself, and an icon for accessing a specific site via the mobile terminal or executing a specific function. Here, the pointer may denote one of tools, such as stylus pen, finger or the like, for substantially touching a specific portion on a display screen or inputting a proximity touch on the portion.

Here, upon touching at least one or more objects displayed on the display 151 using the pointer, in particular, when a part of human body approaches a proximity touch detecting region, every person (user) does not generate the same capacitance. That is, a difference between a value of a minute change in capacitances generated when a part of human body (e.g., a finger) approaches a touch screen and a set value may occur depending on each person (user). Hence, even if the human body moves within the proximity touch detecting region, a recognition rate may differ for each person, which requires the recognition rate of a proximity sensor to be calibrated so as to be appropriate for each user.

In order to perform the embodiment, a proximity calibration screen may be displayed on the display 151 of the mobile terminal. Preferably, the proximity calibration screen may be displayed by separately entering or touching a key within a menu. The proximity calibration screen may display a predetermined reference figure (e.g., circle and other polygons) indicating a maximum (the closest) position (minimum height) of a proximity touch and a minimum (the farthest) position (maximum height) of a proximity touch of a pointer, and a guide figure having a size changed in cooperation with the movement of the pointer. Here, the pointer may denote one of tools, such as stylus pen, finger or the like, for substantially touching a specific portion on a display screen or inputting a proximity touch on the portion.

The guide figure may be displayed as a spot upon a real touch of the pointer. Also, the size of the guide figure may be changed to be the same to that of the reference figure upon a proximity touch of the pointer.

Further, the present invention may be implemented to calibrate a difference of recognition rates caused by a difference of proximity distances (positions) by means of a subject having a maximum/minimum height evenly controlled. Here, the subject may be formed of a material which does not change a capacitance generated upon being contacted by a body.

Figure 5:
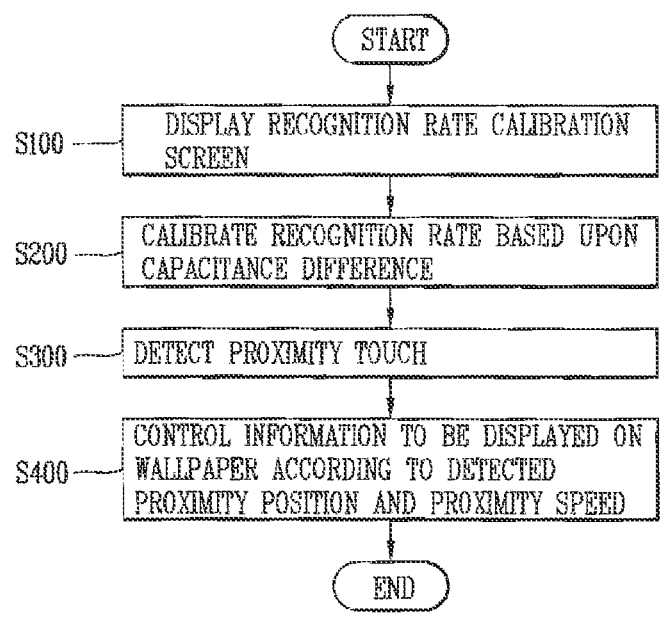
FIG. 5 is a flowchart showing a method for controlling a display screen of a mobile terminal using a proximity touch in accordance with an embodiment of the present invention.

FIG. 5 is a flowchart showing a method for controlling a display screen of a mobile terminal using a proximity touch in accordance with an embodiment of the present invention.

As shown in FIG. 5, when a user executes a calibration of a recognition rate by entering or touching a separate key, the controller 180 displays a screen for calibrating the recognition rate of a proximity touch on the display 151 (S100). The proximity calibration screen may display a predetermined reference figure (e.g., circle and other polygons) indicating a maximum (the closest) position (minimum height) of a proximity touch and a minimum (the farthest) position (maximum height) of a proximity touch of a pointer, and a guide figure having a size changed in cooperation with the movement of the pointer. The guide figure may be displayed as a spot upon a real touch of the pointer. Also, the size of the guide figure may be changed to be the same to that of the reference figure upon a proximity touch of the pointer.

Accordingly, when a user's finger moves close to a proximity touch detecting region of a screen, then the controller 180 displays on the screen one guide circle indicating a current proximity position and a reference circle indicating a maximum proximity position. Afterwards, as the finger moves closer to the screen or farther away from the screen, the size of the guide circle is decreased or increased, thereby calibrating a recognition rate caused due to a difference of capacitances (S200).

If a proximity touch is detected after calibrating the recognition rate due to the difference of the capacitances (S300), the controller 180 controls in various manners operations of objects, namely, icons, avatars, menus and the like displayed on an idle screen and their displaying effects on the screen according to detected proximity position and proximity speed.

Hereinafter, the preferred embodiment of the present invention will be described in more detail.

Figure 6:
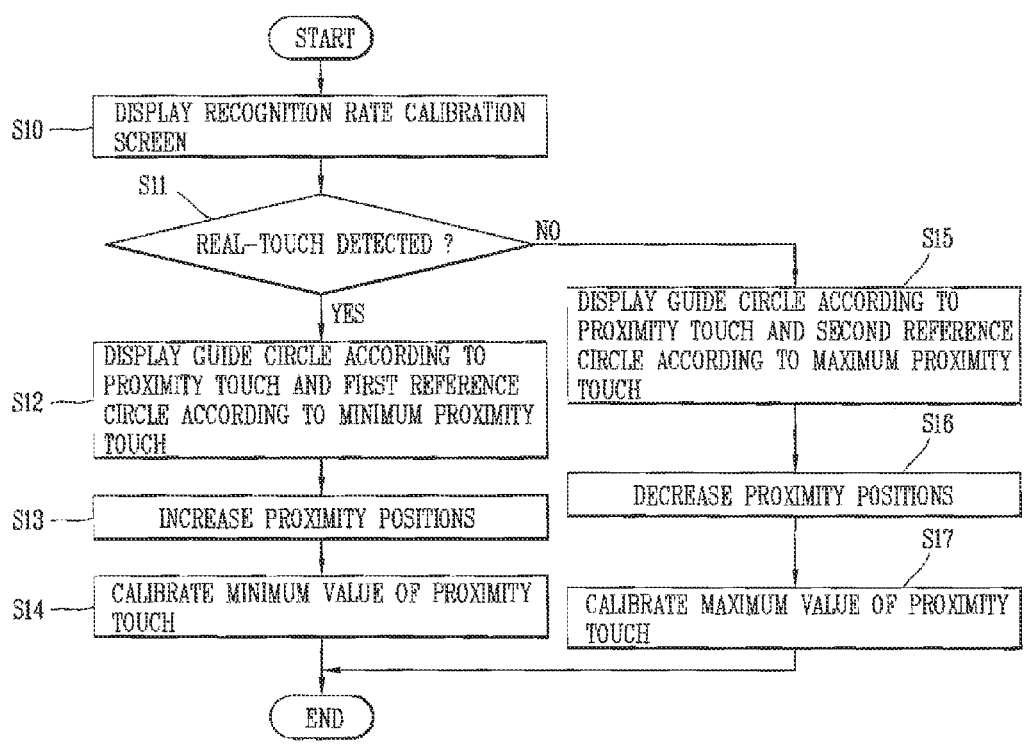
FIG. 6 is a flowchart showing a method for calibrating a recognition rate of a proximity touch of FIG. 5.

FIG. 6 is a flowchart showing a method for calibrating a recognition rate of a proximity touch in the mobile terminal according to the embodiment of the present invention.

As shown in FIG. 6, the controller 180 may display a screen for calibrating a recognition rate of a proximity touch according to a user's touch input (or a separate key input) (S10). If any touch input is detected in the state of the screen being displayed, the controller 180 determines whether or not the corresponding touch is a real touch (S11).

If it is determined to be the real touch, the controller 180 displays a touched point (or a guide circle if a finger is apart from the screen) and a predetermined reference figure, e.g., a first reference circle, which indicates a minimum proximity position (S12). The minimum proximity position corresponds to D3 located at the outermost side in FIG. 4, and the touched point is changed into the guide circle when the finger is apart from the screen. The guide circle is gradually larger in size to have the same size to that of the first reference circle.

Accordingly, when a pointer is removed from the touched point of the touch screen to be farther away from the screen, the size of the guide circle becomes larger in cooperation with proximity positions (or proximity distances) being farther (S13). Here, the pointer may be one of subjects, such as stylus pen, finger or the like, for substantially touching a specific portion on a display screen or inputting a proximity touch on the portion.

Afterwards, if the proximity position is getting farther such that the size of the guide circle becomes the same to that of the first reference circle, a capacitance at the corresponding position is set to a capacitance at a minimum proximity position, thereby calibrating a minimum value of the proximity touch (S14).

On the other hand, at Step S11, upon a proximity touch being detected, the controller 180 displays on a screen a guide circle indicating a proximity position and a predetermined reference figure, e.g., a second reference circle, indicating a maximum proximity position (S15). The maximum proximity touch corresponds to D0 positioned at the innermost position in FIG. 4.

Under this state, if a pointer approaches a touch point of a touch screen, the size of the guide circle becomes smaller in cooperation with the proximity position (or proximity distance) being closer (S16). Then, if the proximity position is becomes further smaller and accordingly the size of the guide circle becomes the same to the size of the second reference circle, a capacitance at the corresponding position is set to a capacitance at a maximum proximity position, thereby calibrating a maximum value of the proximity touch (S17).

Figure 7:
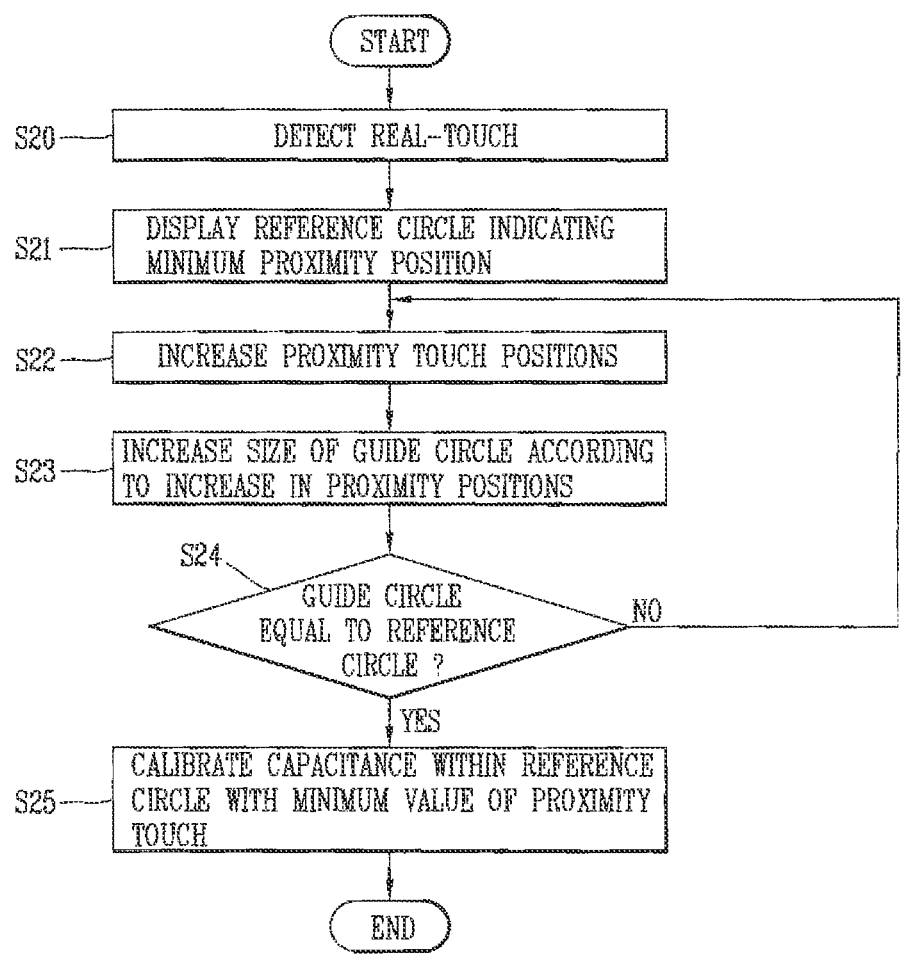
FIG. 7 is a flowchart showing in detail a method for setting a minimum proximity touch value of FIG. 6.

FIG. 7 is a flowchart showing in detail a method for setting a minimum value of a proximity touch of FIG. 6.

As shown in FIG. 7, the controller 180 displays a screen for calibrating a recognition rate of a proximity touch according to a user's touch (or a separate key input).

When a finger touches the screen of the touch screen, the controller 180 displays the corresponding touch point and one reference circle indicating a minimum proximity position (S20 and S21).

Under this state, if the finger is getting away from the screen, the touch point is changed into a guide circle, which then becomes larger in cooperation with the proximity position (or proximity distance) is getting farther (S22 and S23).

Afterwards, if the finger is further away from the screen, the controller 180 compares whether the size of the guide circle is the same to the size of the reference circle (S24). If the sizes are the same to each other according to the comparison result, the controller 180 recognizes it as the finger arrives at the minimum proximity position, and then calibrates a capacitance at the corresponding position with the minimum value of the proximity touch (S25).

Figure 8:
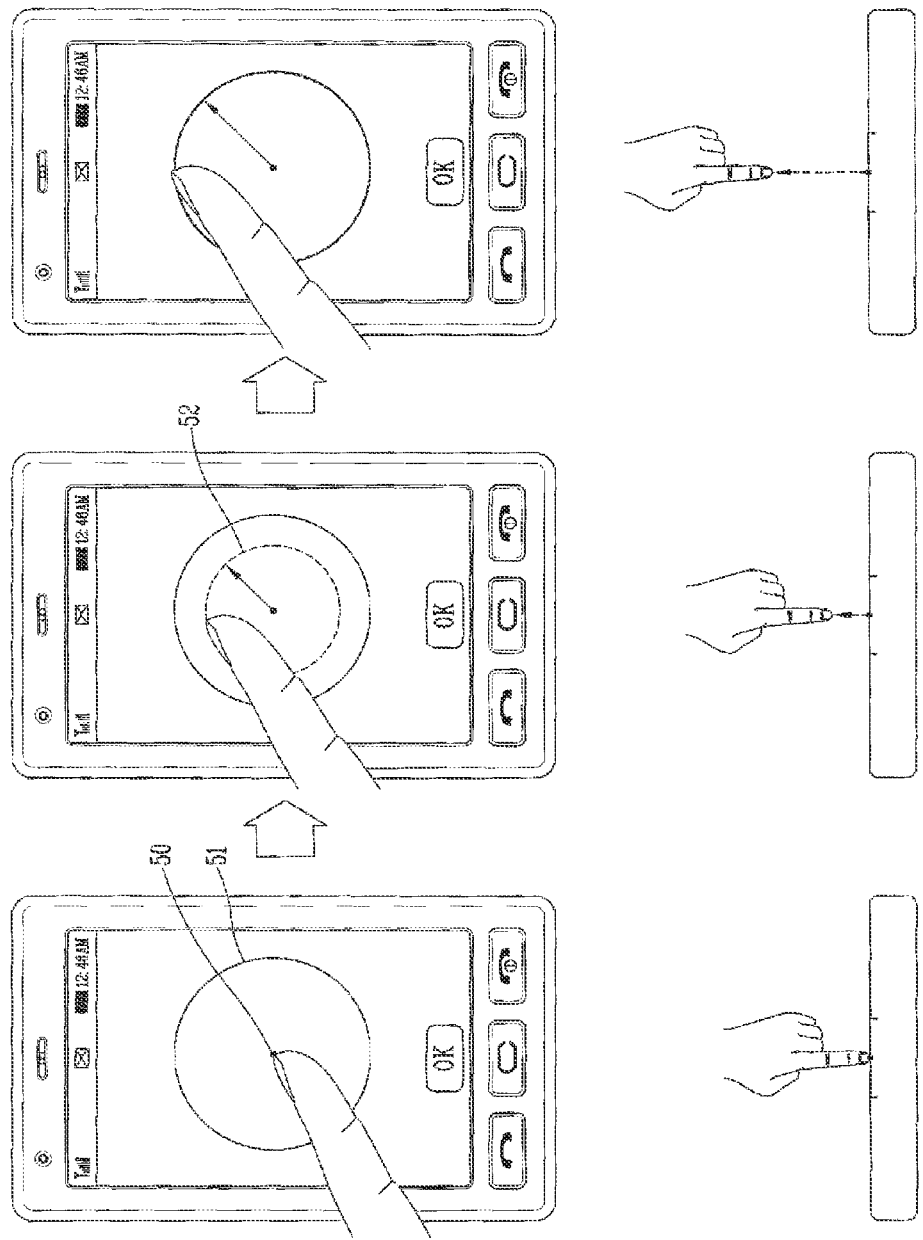
FIG. 8 is an exemplary view of performing the method shown in FIG. 7.

FIG. 8 is an exemplary view of performing the method shown in FIG. 7.

When a finger touches a recognition rate calibration screen, the controller 180 displays a touch point 50 and one reference circle 51 indicating a minimum proximity position.

Under this state, if the finger is apart from the screen, the touch point 50 is changed into a guide circle 52. The size of the guide circle 52 is increased or decreased in cooperation with the proximity position (or proximity distance) being farther or closer.

Afterwards, if the finger is farther away from the screen and accordingly the size of the guide circle 52 becomes the same to the size of the reference circle 51, the controller 180 recognizes it as the finger arrives at the minimum proximity position, and calibrates the capacitance at the corresponding position with the minimum value of the proximity touch.

By employing such method, the recognition rate due to the difference of capacitances can be calibrated and increased, which allows a user to use the more accurate proximity touch function.

Figure 9:
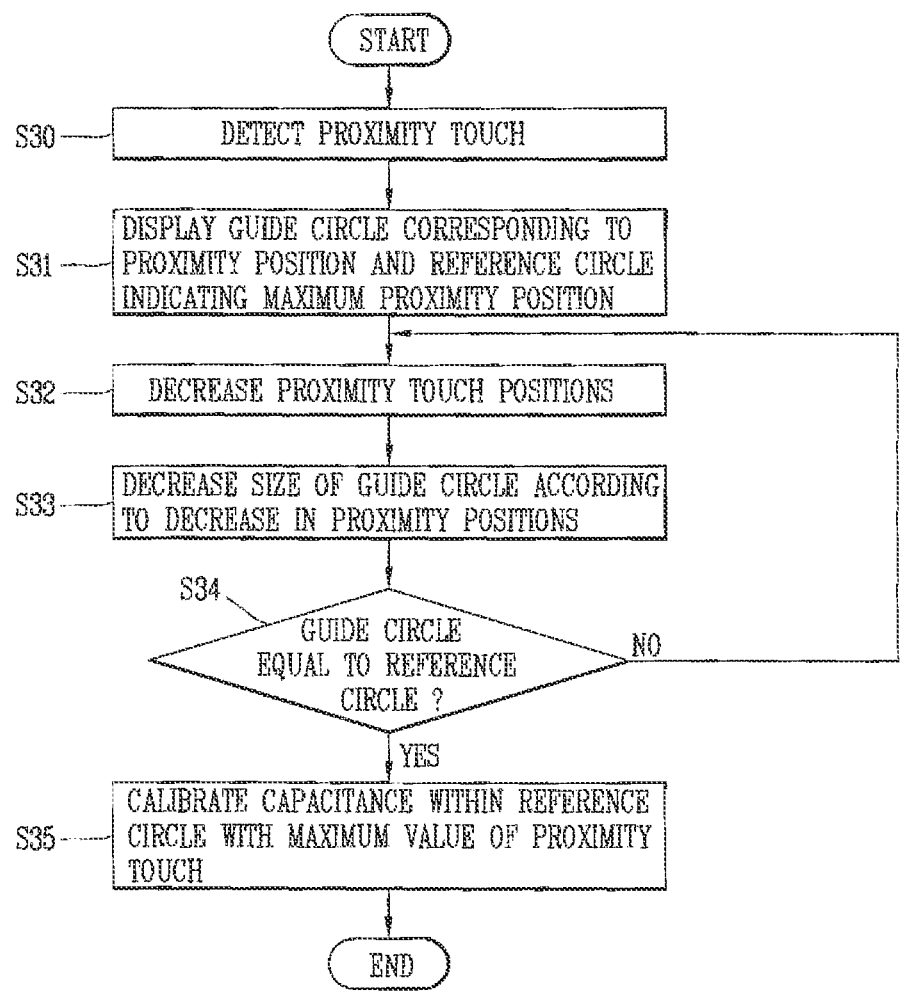
FIG. 9 is a flowchart showing in detail the method for setting the minimum proximity touch value of FIG. 6.

FIG. 9 is a flowchart showing in detail the method for setting the minimum value of a proximity touch of FIG. 6.

As shown in FIG. 9, the controller 180 can display a screen for calibrating a recognition rate of a proximity touch according to a user's touch (or a separate key input). Also, the operations of FIG. 9 may consecutively be performed in related to the operations of FIG. 7. Upon a finger or the like being close to a proximity touch detecting region of the screen, the controller 180 displays on the screen one guide circle indicating a current proximity touch and a reference circle indicating a maximum proximity position (S30 and S31). The maximum proximity position corresponds to D0 located at the innermost side in FIG. 4.

Under this state, if the finger is getting closer to the screen, the size of the guide circle is cooperatively decreased as the proximity position (or proximity distance) is getting closer to the screen (S32 and S33).

Afterwards, if the finger is further closer to the screen, the controller 180 compares whether the size of the guide circle is the same to the size of the reference circle (S34). If the sizes are the same to each other according to the comparison result, the controller 180 recognizes it as the finger arrives at the maximum proximity position D0, and thus calibrates the capacitance at the corresponding position with the maximum value of the proximity touch S(35).

Figure 10:
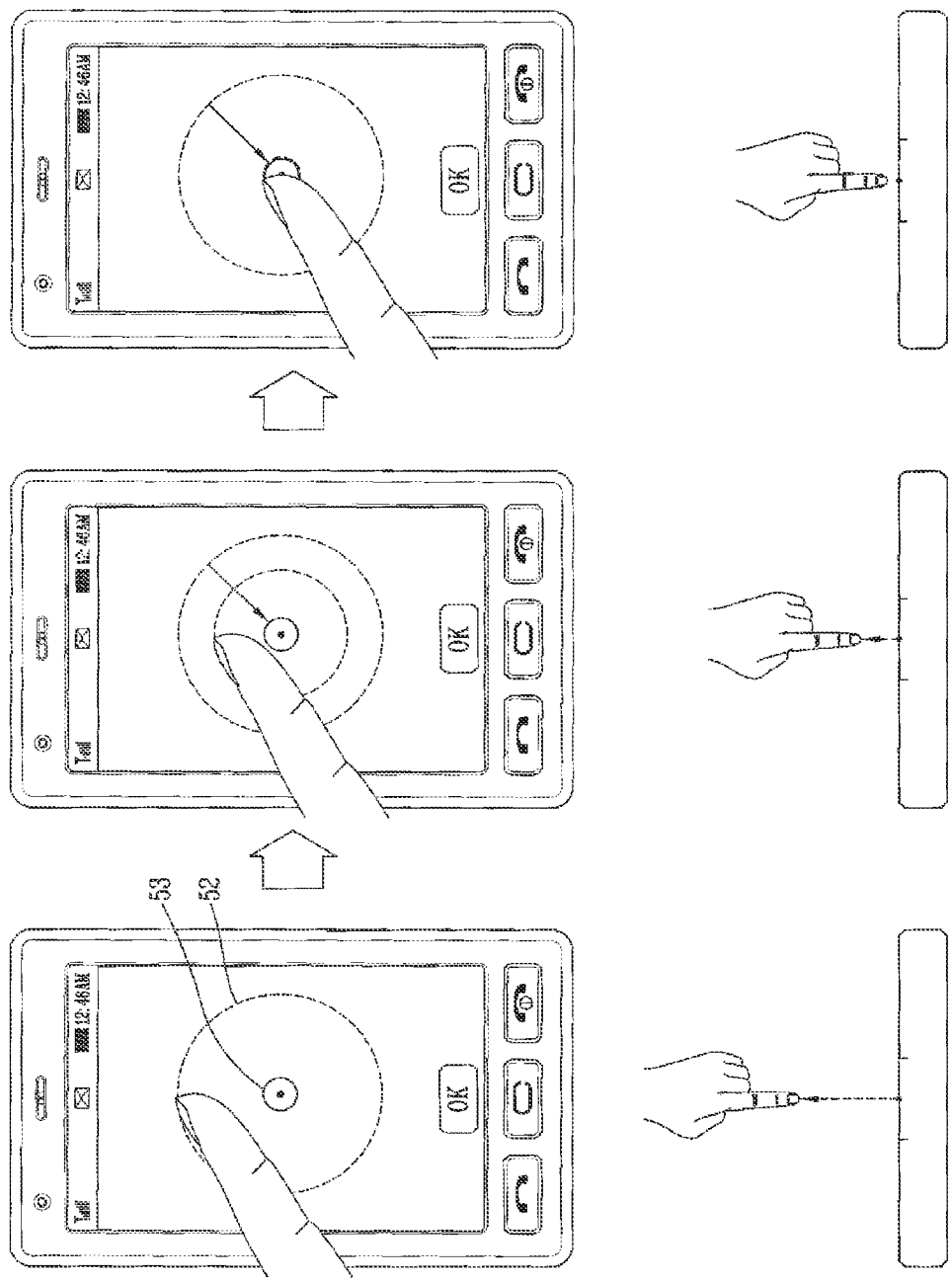
FIG. 10 is an exemplary view of performing the method shown in FIG. 9.

FIG. 10 is an exemplary view of performing the method shown in FIG. 9.

In a state where the minimum value of the proximity touch has been calibrated or if a finger inputs a proximity touch on the recognition rate calibration screen, the controller 180 displays a guide circle 52 indicating a proximity position and a reference circle 53 indicating a maximum proximity position.

Under this state, if the finger is closer to the screen, the size of the guide circle 52 is further decreased as the proximity position (or proximity distance) is getting closer.

Afterwards, if the finger is much closer to the screen and thus the size of the guide circle 52 becomes the same to the size of the reference circle 53, the controller 180 recognizes it as the finger arrives at the maximum proximity position, and thus calibrates the capacitance at the corresponding position with the maximum value of the proximity touch. By employing such method, the recognition rate due to the difference of capacitances can be calibrated and increased, which allows a user to use the more accurate proximity touch function.

The embodiment of the present invention may be implemented such that the operations of FIG. 7 are first performed and the operations of FIG. 9 are then performed. Alternatively, it may be implemented such that the operations of FIG. 9 are first performed and the operations of FIG. 7 are then performed. That is, when a real touch is first performed on the recognition rate calibration screen, the operations may be executed in the order of FIG. 7→FIG. 9. When a proximity touch is first performed, the operations may be executed in the order of FIG. 9→FIG. 7. Depending on such order of performing operations, a reference circle and a guide circle represented on the screen are defined.

Figure 11:
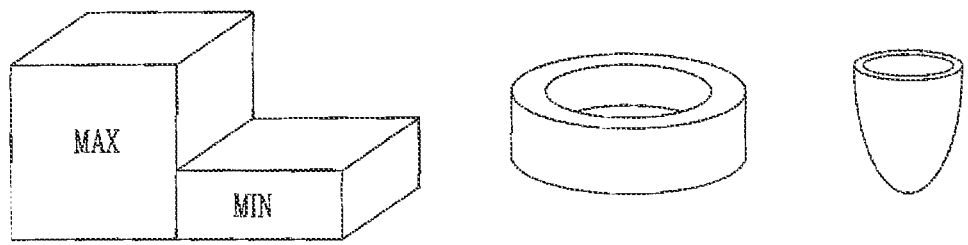
FIG. 11 is an exemplary view of subjects with a maximum height and a minimum height.

In the method for calibrating the recognition rate shown in FIGS. 6 to 10, the arrival to the minimum proximity position or maximum proximity position was performed by comparing the reference circle with the guide circle, and thereafter the minimum value and the maximum value of the proximity touch were set (or calibrated) at the corresponding positions. The present invention may not be limited to such embodiment; however, every user may be allowed to have the same minimum proximity position or maximum proximity position so as to set (or calibrate) the minimum value and the maximum value of the proximity touch at the corresponding positions. The subject as a non-conductor with a maximum height and a minimum height, as shown in FIG. 11, may be formed of a material (e.g., non-conducting substance, rubber and the like) in a shape (e.g. an annular shape), thereby not affecting the measurement of the capacitance of the finger.

Figure 12:
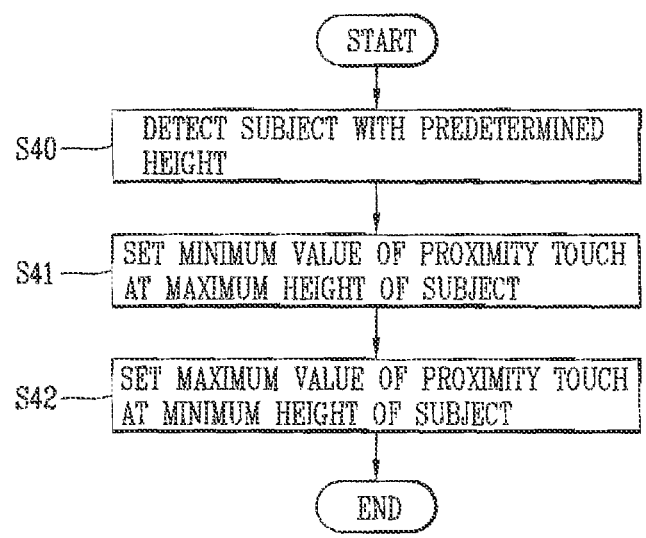
FIG. 12 is a flowchart showing a method for calibrating a proximity touch recognition rate using a subject with a maximum height and a minimum height in accordance with an embodiment of the present invention.
Figure 13:
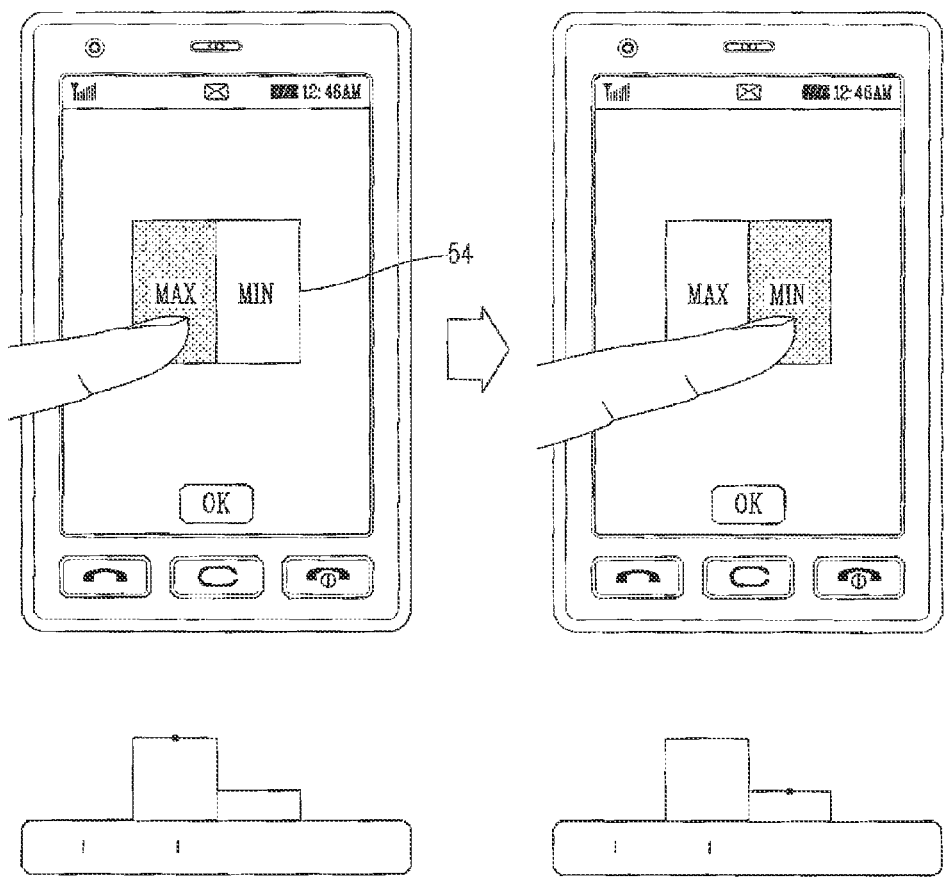
FIG. 13 is an exemplary view of performing the method shown in FIG. 12.

FIG. 12 is a flowchart showing a method for calibrating a proximity touch recognition rate using a subject with a maximum height and a minimum height in accordance with an embodiment of the present invention, and FIG. 13 is an exemplary view of performing the method shown in FIG. 12.

As shown in FIGS. 12 and 13, a user places on a touch screen a subject 54 with a maximum height and a minimum height in a mode for calibrating a recognition rate of a proximity touch. The controller 180 detects the position of the subject 54. The controller 180 then sets a capacitance of a finger which touches the subject 54 at the maximum height to a minimum value of the proximity touch (S40 and S41), and sets a capacitance of the finger which touches the subject 54 at the minimum height to a maximum value of the proximity touch (S42).

Figure 14:
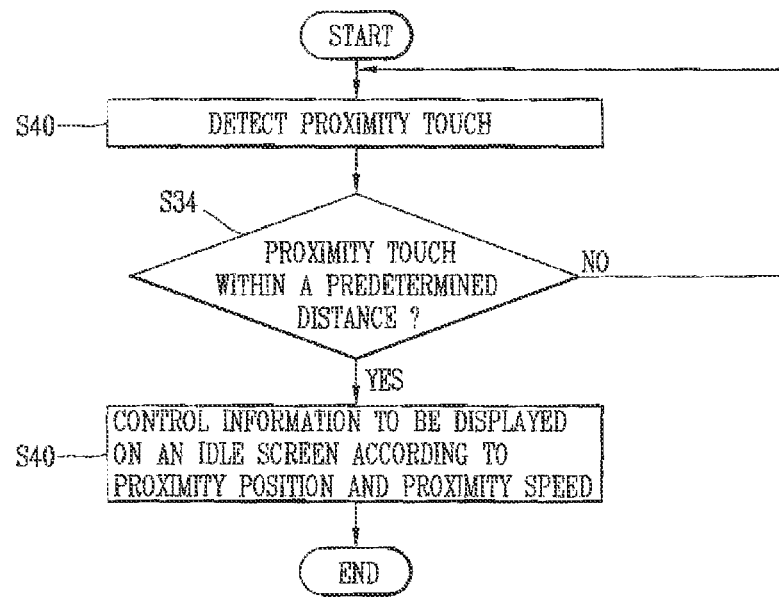
FIG. 14 is a flowchart showing a method for displaying a screen using a proximity touch in a mobile terminal in accordance with one embodiment of the present invention.

FIG. 14 is a flowchart showing a screen displaying method using a proximity touch in a mobile terminal according to an embodiment of the present invention, which particularly shows a method for controlling a display screen according to a proximity position and a proximity speed.

An idle screen of the mobile terminal displays at least one or more avatars by which various operations of the mobile terminal can immediately be executed without selecting a menu. The avatars may be set to have the same size, and their positions and arrangement may be optionally be changed by a user.

As shown in FIG. 14, when a user moves a pointer close to an idle screen of the mobile terminal, the sensing unit 140 detects the proximity touch of the pointer, thereby to calculate a proximity position (distance) and/or a proximity speed based upon the detected data (S50). The pointer include subjects, such as stylus pen, finger or the like, for substantially touching a specific portion on a display screen or inputting a proximity touch on the portion.

The proximity position may be calculated based upon four proximity distances D0 to D3 shown in FIG. 4, and the proximity speed v may be calculated by Formula (1) as follows;

$$\text{Proximity speed }(v) = \text{proximity distance difference/time difference }(dD/dT) \quad \text{Formula (1)}$$

The controller 180 receives the proximity position and the proximity speed from the sensing unit 140, and controls displaying of information on the standby screen, e.g., controls at least one or more of sizes, positions and movements of the avatars, according to the proximity position and the proximity speed of the pointer (S51 and S52). The present invention may set the proximity position (distance) to D2 of FIG. 4, for example.

Afterwards, when the pointer moves away from the standby screen to be out of the proximity touch detecting region, the avatars on the standby screen are rearranged into their original state.

Figure 15:
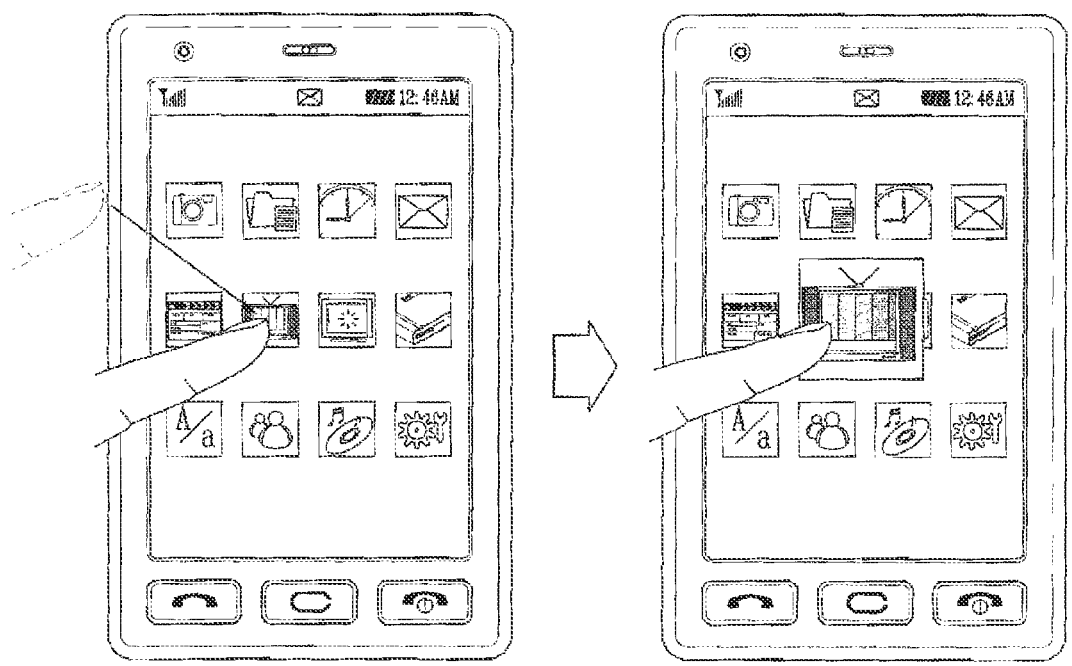

FIG. 15 is an exemplary view of the method shown in FIG. 14.

The example of FIG. 15 shows that a size of an icon is changed according to a proximity position (distance) of a pointer (a finger in this example).

When the finger moves close to a specific icon of a plurality of icons, the sensing unit 140 detects a proximity position of the finger and outputs the detected proximity position to the controller 180. The controller 180 controls the size of the corresponding icon to be larger than other icons so as to be easily selected. Alternatively, the sizes of the icons may be controlled such that an icon to be selected can have a large size and others become smaller about a proximity touch point.

Afterwards, when the finger is apart from the standby screen to be out of the proximity touch detecting region, the avatars on the standby screen may be returned to their original positions and sizes.

Therefore, the user can substantially touch the size-increased icon to perform his desired operation.

Figure 16:
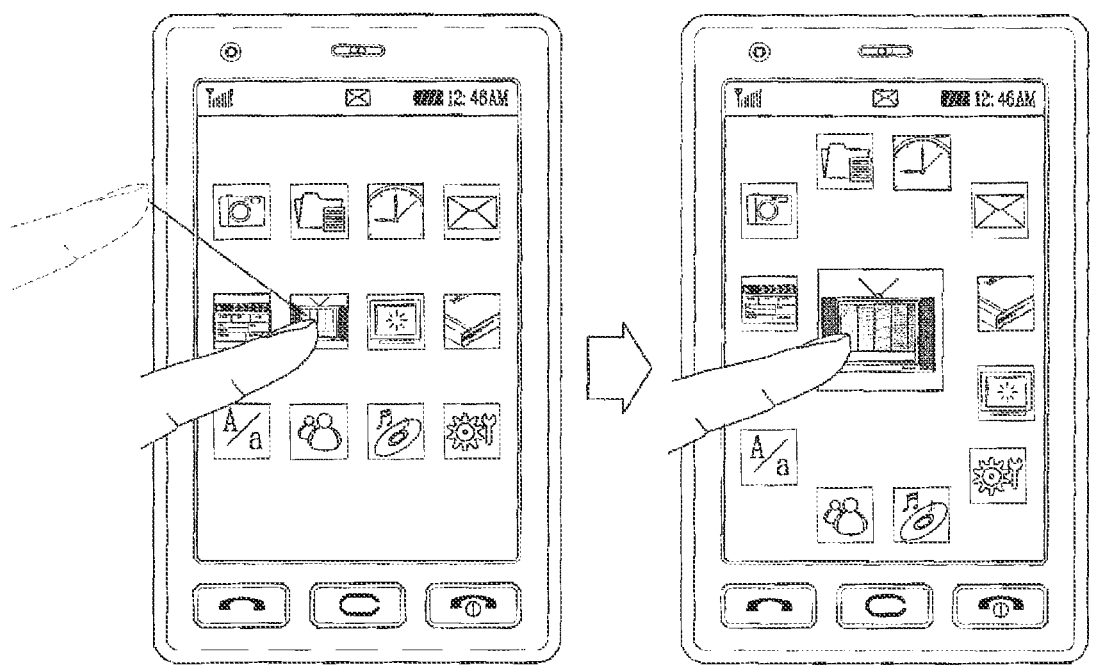

FIG. 16 is another exemplary view of performing the method shown in FIG. 14.

The example of FIG. 16 shows that size and position of an icon are changed according to a proximity position (distance) of a finger. That is, when a user places his finger above an icon desiring to select, other icons become smaller and distributed around the selected icon. The selected icon becomes larger at its original position. Here, the icon to be selected may become larger in size and other icons are gradually getting smaller in sizes to be distributed from a central portion of the screen towards the outer sides thereof, according to the proximity distance of the finger.

Afterwards, when the finger is apart from the standby screen to be out of the proximity touch detecting region, the avatars on the standby screen are returned to their original states.

Also, the sizes of the icons and the speed of the icons being distributed may be controlled according to a proximity speed.

Figure 17:
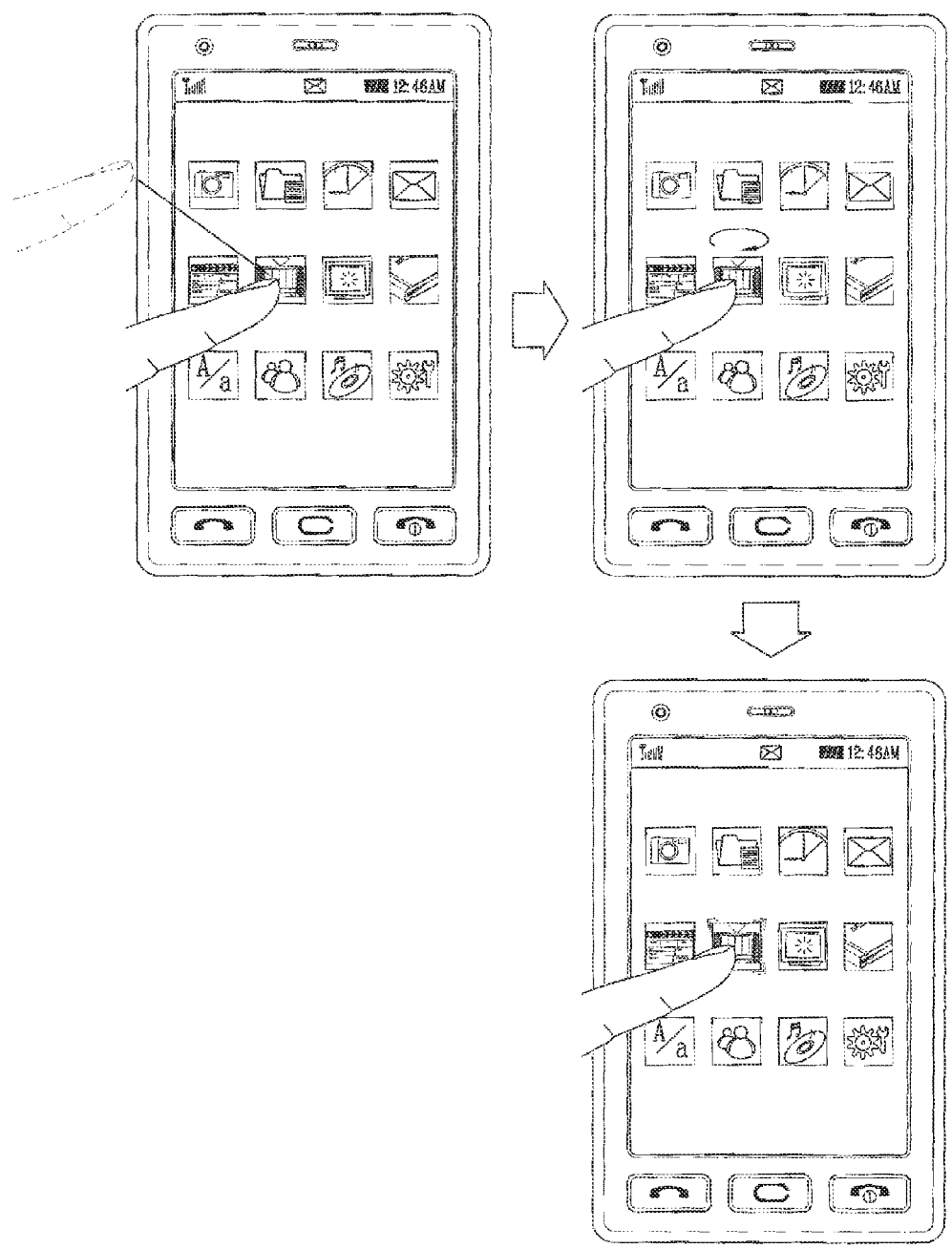

FIG. 17 is another exemplary view of performing the method shown in FIG. 14.

The example of FIG. 17 shows that an effect is applied to an icon according to a proximity position (distance) of a finger.

As shown in FIG. 17, when a user moves a finger to an icon desiring to select, the controller 180 can control the icon to be selected or its neighboring icons to be rotated at their positions. If only the icon to be selected is rotated, the rotation speed may differ according to the proximity position. Further, if the icon to be selected or its neighboring icons are rotated, the icon to be selected may be rotated at a high speed and the neighboring icons may be rotated at a lower speed.

When the user moves the finger towards the icon desiring to select, the controller 180 controls the alarm 153 of the output unit 150 so as to apply a vibration (effect) to the icon to be selected. Even in this case, the strength of the vibration may be controlled according to the proximity position (distance) or the proximity speed of the finger. For instance, if the finger fast approaches the icon to be selected, the strength of the vibration may be increased or become rough. On the other hand, if the finger slowly moves toward the icon to be selected, the strength of the vibration may become weaker or softer.

Also, in addition to controlling the movement of the icons, the present invention may be configured such that when a finger moves close to a specific icon, the audio output module 152 of the output unit 150 may be controlled to output sound.

Figure 18:
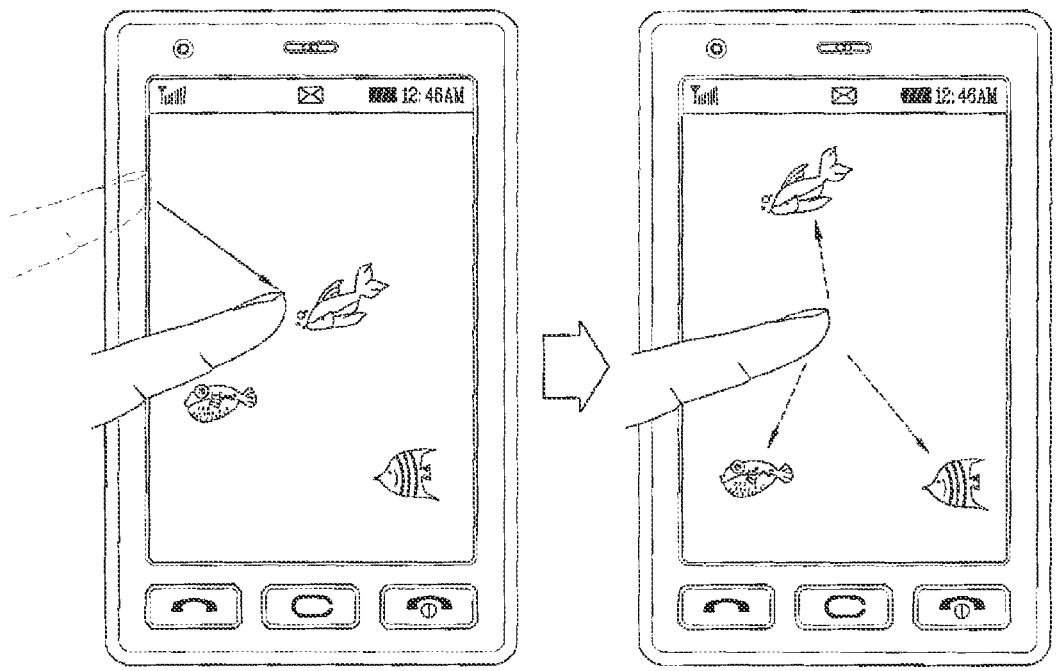

FIG. 18 is another exemplary view of the method shown in FIG. 14. FIG. 18 shows a method for controlling positions and movements of subjects on a wallpaper (background screen, idle screen, standby screen) according to a proximity position and a proximity speed.

As shown in FIG. 18, users may often set a wallpaper to a form of an animation or idle screen including subjects such as fishes or animals.

If a user's finger comes close to the wallpaper, the controller 180 may control the positions and movements of the subjects based upon proximity position (distance) and proximity speed detected by the sensing unit 140.

For instance, if the wallpaper is configured in a form of animation or flash with fishes swimming or animals moving, the controller 180 may control the wallpaper such that the fishes or animals gather around the finger or run away from the finger when the finger comes close to the screen. In particular, in case of configuring a wallpaper such that fishes are swimming in a pond, if a finger comes close to the pond, such behavior may derive an effect as if waves are spread when a piece of stone is thrown into the pond. Further, such shape of wave gets larger as the finger comes closer to the wallpaper.

Also, a speed of fishes being gathered or run away may be differently set according to a proximity speed of the finger. As one example, if the finger fast comes, the fishes may be fast run away from the position where the finger approaches and be kept away from the position. Even in this case, the strength of vibration and the effect (or effect sound) may differently be controlled in cooperation with the movement of the objects (e.g., animals, fishes and the like).

Afterwards, if the finger is apart from the wallpaper to be out of the proximity touch detecting region, the wallpaper may be returned to its original state.

Also, in the screen displaying method using the proximity touch in the mobile terminal according to the embodiment of the present invention, the controller 180 may display a menu or icon hidden in a specific position when a user moves a pointer towards the corresponding position. The menu or icon may be changed according to a distance of the pointer being close to the screen. Generally, as the pointer comes closer, a larger portion of the menu or icon may be viewable. Also, the menu or icon may be set to make a different strength of vibration or a different effect (effect sound) according to the proximity speed of the pointer.

If the more number of menus and avatars are displayed on the wallpaper of the mobile terminal, a user may be allowed to conveniently select his desired menu or avatar. However, if too many menus or avatars are displayed, they may spoil the screen. Thus, some of menus or avatars may be displayed if necessary.

That is, if a pointer comes close to a predetermined position of the wallpaper, the controller 180 checks a position of the wallpaper where the proximity touch is generated. Upon checking the position where the proximity touch is generated, the controller 180 displays menus or avatars hidden in the corresponding position on the wallpaper. Here, the speed displaying the menus or avatars may be in proportion to the proximity speed.

Further, if the pointer moves further closer in the state of the menu or avatars already displayed, as mentioned above, the sizes or movements of the menus or avatars can be controlled or the generation of vibration or output sound can be controlled.

Figure 19:
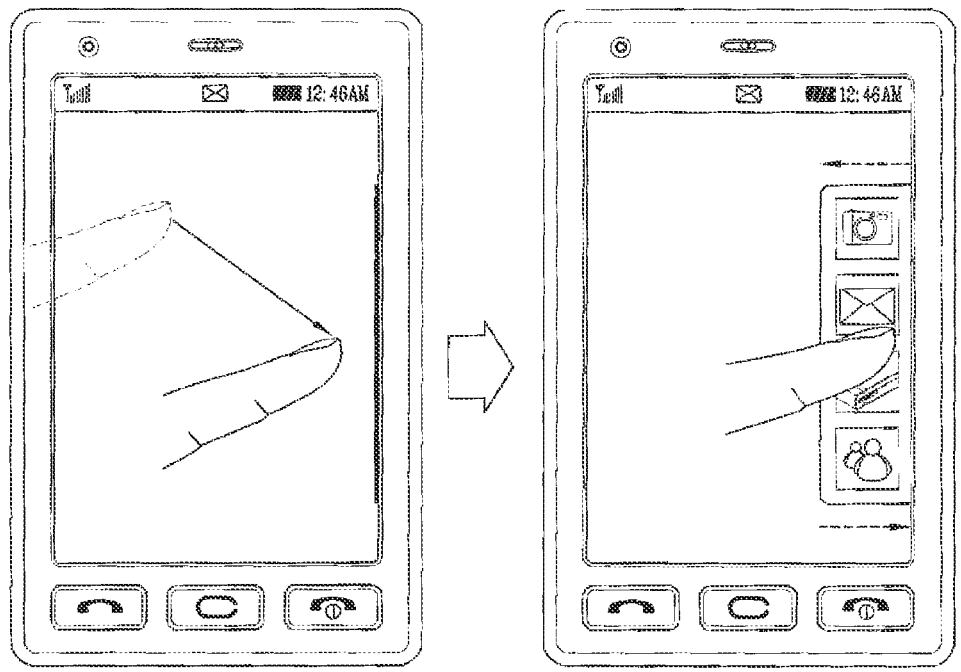

FIG. 19 is a view showing an embodiment of performing the method shown in FIG. 14, which shows one embodiment of displaying menus or icons hidden in a specific position.

As shown in FIG. 19, when a finger approaches a predetermined position of a wallpaper, a size or movement of a menu or avatar to be selected may be controlled or a generation of vibration or output sound may be controlled.

Afterwards, if the finger moves away from the wallpaper to be out of the proximity touch detecting region (i.e., if the proximity touch is released), the wallpaper may be returned to its original state.

As mentioned above, the operation of controlling the operating method (e.g., controlling size, movement, and effect) of an icon, avatar or menu according to a proximity position (distance) and a proximity speed on the wallpaper was exemplarily described present invention; however, the present invention may not limited to the operation but may perform other various functions of the mobile terminal.

FIG. 20 shows an embodiment of performing the method shown in FIG. 14, which exemplarily shows that contents included in a corresponding icon is displayed on a screen or characters displayed on the screen are moved along a touch being moved. That is, the proximity touch may be used to perform, for example, displaying profile information relating to a friend, using a messenger, placing a call, sending SMS MMS or e-mail, and the like.

The aforesaid methods according to one embodiment of the present invention can be implemented as computer-readable codes in a program-recorded medium. The computer-readable medium may include all types of recording devices each storing data readable by a computer system.

Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

What is claimed is:

1. A mobile terminal comprising:
    a display having a touch screen;
    a sensing unit configured to detect a proximity touch or a real touch of a pointer; and
    a controller configured to:
        control the display to display a reference figure and a guide figure upon the sensing unit detecting the proximity touch or the real touch;
        control the display to decrease or increase a size of the guide figure upon the sensing unit detecting movement of the pointer toward or away from the touch screen; and
        set a value of a capacitance of the touch screen as a maximum proximity capacitance or a minimum proximity capacitance when the size of the guide figure becomes equal to a size of the reference figure.

2. The terminal of claim 1, wherein the pointer comprises a stylus pen or a finger.

3. The terminal of claim 1, wherein the reference figure comprises a circle or a polygon.

4. The terminal of claim 1, wherein the controller is further configured to:
    control the display to decrease the size of the guide figure upon the sensing unit detecting movement of the pointer toward the touch screen when the sensing unit detects the proximity touch of the pointer;
    set the value of the capacitance of the touch screen as the maximum proximity capacitance when the size of the guide figure becomes equal to the size of the reference figure when the sensing unit detects the proximity touch;
    control the display to increase the size of the guide figure upon the sensing unit detecting movement of the pointer away from the touch screen when the sensing unit detects the real touch of the pointer; and
    set the value of the capacitance of the touch screen as the minimum proximity capacitance when the size of the guide figure becomes equal to the size of the reference figure when the sensing unit detects the proximity touch.

5. A method for calibrating a capacitance of a mobile terminal, the method comprising:
    displaying a calibration screen on a touch screen;
    detecting a proximity touch or a real touch of a pointer via the touch screen;
    displaying a reference figure and a guide figure on the calibration screen upon detecting the proximity touch or the real touch;
    decreasing or increasing a size of the guide figure upon detecting movement of the pointer toward or away from the calibration screen;
    comparing the size of the guide figure with a size of the reference figure; and
    setting a value of the capacitance of the touch screen as a maximum proximity capacitance or a minimum proximity capacitance when the size of the guide figure becomes equal to the size of the reference figure.

6. The method of claim 5, wherein the reference figure comprises a circle or a polygon.

7. The method of claim 5, wherein the pointer comprises a stylus pen or a finger.

8. The method of claim 5,
    wherein decreasing or increasing the size of the guide figure upon detecting movement of the pointer toward or away from the calibration screen comprises decreasing the size of the guide figure upon detecting movement of the pointer toward the calibration screen when the proximity touch is detected, and
    wherein setting the value of the capacitance of the touch screen as the maximum proximity capacitance or the minimum proximity capacitance comprises setting the value of the capacitance of the touch screen as the maximum proximity capacitance when the size of the guide figure becomes equal to the size of the reference figure when the proximity touch is detected.

9. The method of claim 5,
    wherein decreasing or increasing the size of the guide figure upon detecting movement of the pointer toward or away from the calibration screen comprises increasing the size of the guide figure upon detecting movement of the pointer away from the calibration screen when the real touch is detected, and
    wherein setting the value of the capacitance of the touch screen as the maximum proximity capacitance or the minimum proximity capacitance comprises setting the value of the capacitance of the touch screen as the minimum proximity capacitance when the size of the guide figure becomes equal to the size of the reference figure when the real touch is detected.

* * * * *